United States Patent [19]

Anderson et al.

[11] Patent Number: 5,230,918
[45] Date of Patent: Jul. 27, 1993

[54] CAKE ICING COMPOSITION UTILIZING A FOOD MODIFYING COMPOSITION AND PROCESS FOR MAKING SAME

[75] Inventors: Wendy A. Anderson, New York; Jimbay Loh, Peekskill; Dreena Dulin, Tarrytown, all of N.Y.

[73] Assignee: Kraft General Foods, Inc., Northfield, Ill.

[21] Appl. No.: 865,593

[22] Filed: Apr. 9, 1992

[51] Int. Cl.$^5$ .................... A23L 1/308; A23G 3/00
[52] U.S. Cl. .................................. 426/572; 426/659; 426/804; 426/658
[58] Field of Search .............. 426/572, 659, 804, 658, 426/578, 613

[56] References Cited

U.S. PATENT DOCUMENTS

| | | | |
|---|---|---|---|
| 4,232,049 | 11/1980 | Blake | 426/572 |
| 4,714,620 | 12/1987 | Bunick | 426/572 |
| 4,798,734 | 1/1989 | Kaneda | 426/572 |
| 4,985,270 | 1/1991 | Singer et al. | 426/572 |

FOREIGN PATENT DOCUMENTS 0206622 2/1984 Fed. Rep. of Germany ...... 426/572

*Primary Examiner*—Jeanette Hunter
*Attorney, Agent, or Firm*—Linn I. Grim

[57] ABSTRACT

A cake icing composition and process for making same is disclosed. The cake icing composition comprises sugar and/or starch, water and a food modifying composition. The food modifying composition independently includes a dispersion of an edible soy fiber having a particle size in the range of between about 0.1 micron and about 20 microns, present in a concentration of between about 5% and about 30%, and an aqueous liquid, present in a concentration of between about 70% and about 95%, said percentages being by weight, based on the total weight of the food modifying composition. In the process of making this composition the sugar, water and food modifying composition are blended together. The food modifying composition is itself formed by dispersing the edible soy fiber having a particle size in excess of 20 microns in the aqueous liquid and wet-milling the resultant dispersion so that the soy fiber has a particle size in the range of between about 0.1 micron and about 20 microns.

40 Claims, No Drawings

CAKE ICING COMPOSITION UTILIZING A FOOD MODIFYING COMPOSITION AND PROCESS FOR MAKING SAME

BACKGROUND OF THE INVENTION

1. Field of the Invention

The present invention relates to a cake icing composition which is substantially or totally fat-free. The cake icing composition includes a fat-free substitute characterized by fat-like mouthfeel and a flavor profile which resembles the same cake icing composition containing fat.

2. Background of the Prior Art

The food art is replete with disclosures of food modifiers, particularly fat substitutes, which disclose small particles of carbohydrate and/or protein which serves to simulate the water-in-oil emulsion properties of a fat or cream.

German Patent Application 2345806 (published Mar. 20, 1975) discloses fine grinding of a bran, such as wheat, corn, rice and barley to a particle size between 0 and 50 microns, preferably 0 to 20 microns, and then using such product as filler in low calorie foods.

U.S. Pat. Nos. 4,143,174 and 4,209,503 to Shah et al. show colloidal protein particles having an average particle size of less than 10 microns, preferably less than 5 microns being used as a food modifier for stability, thickening, clouding, gelling and viscosity control purposes.

U.S. Pat. No. 3,023,104 to Battista discloses microcrystalline cellulose at 1 to 300 microns, preferably 1 micro, as a fat substitute. U.S. Pat. No. 2,573,058 to Tiemstra adds a hydrocolloid, such as sodium alginate, to Battista's product to improve its storage stability.

U.S. Pat. No. 4,103,037 to Bodor et al. disclose small particles of protein (below 5 microns) in a low fat spread. In a later patent (U.S. Pat. No. 4,591,507), Bodor et al. use hydrated starch, from corn, wheat, oats and rice, as a partial fat replacement in margarine to improve the stability and spattering behavior of the margarine. Small particles of hydrated rice starch (8 to 15 microns after swelling) are used for this purpose in margarine.

U.S. Pat. No. 4,305,964 to Moran et al. shows gelled water beads at 50 to 10 microns, preferably coated with a layer of oil, in an artificial cream. Gelled spheres containing hydrocolloid at 10 to 20 microns are shown by Moran et al. (U.S. Pat. No. 4,305,970), as well as fine fat particles at 0.1 to 2 microns in a dispersed phase of 10 to 40 microns (U.S. Pat. No. 4,515,825).

U.S. Pat. No. 4,734,287 to Singer et al. discloses coagulated proteins under heat an shear conditions shaped into spheroidal particles of 0.1 to 2 microns to create the creamy mouthfeel characteristic of fats and oils. This same technique is shown in Singer et al.'s later patent (U.S. Pat. No. 4,911,946) applied to any carbohydrate (starches, gums, cellulose) to achieve this same creamy mouthfeel.

A "Dyno-Mill" sales brochure (published June 1986) by Glen Mills Inc. of Maywood, N.J. discloses that a "Dyno-Mill" machine can be used for extremely fine (0.1 micron) wet-milling of various food ingredients. Ingredients such as chocolate sauce, imitation chocolate, nut cream fat/sugar mixtures, soya flour, coffee, flavoring, etc. are disclosed.

Icings are classified according to their fat content. Cake icings have 10–25% fat, and butter cream icings contain 20–25% fat by weight. This fat provides many organoleptic as well as functional characteristics in the icing including body, shortness, creamy texture, smooth mouthfeel, flavor delivery, viscosity for aeration and shape retention, spreadability, moisture migration control, opacity and whiteness. In addition to fat, other ingredients serve many functions in the icing system. By weight, sugar is the primary ingredient in icing. Cold process icings require fondant or powdered rather than granular sugar to prevent a gritty or grainy texture. Confectioners or 4× sugar is suitable for most requirements, but finer grain sugars such as 6×, 10×, 12× or fondant sugar may be used to impart greater smoothness. Fondant is a supersaturated sucrose solution formed by heat and then cooled with agitation to give a plastic mass of very small, uniform sugar crystals. Water functions as a solvent for the sugar as well as impairing necessary spreadability. Water added to the icing to reduce the viscosity frequently leads to the physical break down or "curdling" of the icing. This is caused in part by partial solubilization of the sugar which plays an integral role in the structure of the icing. For this reason, syrups rather than water are used to thin an icing. Non-fat dry milk is usually added for flavor purposes while not adding any additional moisture.

There are many disclosures of cake icing compositions in the prior art. Although these disclosures describe cake icing compositions none of them disclose the manufacture of icings which although fat-free retain those properties of fat-containing icings which make them so desirable. For example, fat-free frostings have been made which were quite dense in structure and "pudding-like" or rubbery in texture. Hydrocolloids, in particular, when substituted for fat give a rubbery consistency, poor flavor, and a severe case hardening effect. Fat-free frostings made from a fondant base have a marshmallow-like flavor and a thick, heavy fondant texture. Fat-free frostings made from a starch base have a stringy long texture and a flavor which is uncharacteristic of a frosting. Most importantly, these fat substitutes do not simulate the cream-like or fat-like properties of the fat which is replaced. Furthermore, the above-discussed prior art, which discloses the micromilling of edible natural fibers, among other materials, which can be used in food products for various purposes, does not disclose or suggest a food modifying composition that provides fat substitution without the adverse effects usually noticed when fat is substituted in food products.

SUMMARY OF THE INVENTION

The present invention is directed to a cake icing composition substantially or totally fat-free which retains the taste and texture of the desirable fat-containing cake icings of the prior art.

In accordance with the present invention a cake icing composition is provided. The cake icing composition comprises sugar and/or starch and water and a food modifying composition. The food modifying composition includes a dispersion of about 1% to about 15% edible soy fiber having a particle size in the range of between about 0.1 micron and about 20 microns, present in about 99% to about 85% aqueous liquid (said percentages being by weight, based on the total weight of the food modifying composition). The aqueous liquid may be water, milk or an aqueous sugar solution. In the case of an aqueous sugar solution, the sugar can be any sugar, including sucrose, dextrose, fructose, sorbitol, corn syrup solids and high fructose corn syrup solids (HFCS). The cake icing may contain as little as 0% to as much as 100% of the food modifying composition. In other words, the food modifying composition itself can in certain cases be the cake icing.

In further accordance with the present invention a process for making a cake icing composition is set forth. In this process sugar and/or starch and water and a food modifying composition are blended together to form the composition. The food modifying composition component is itself formed by dispersing about 1% to about 15% edible soy fiber having a particle size of above about 20 microns in about 99% to about 85% aqueous liquid (said percentages being by weight, based on the total weight of the dispersion). As indicated, the aqueous liquid may be water, milk, or an aqueous sugar solution. The dispersion is thereupon wet-milled so that the particle size of the soy fiber is reduced to a range of between about 0.1 micron and about 20 microns. The food modifying composition may be present in the icing at from about 10% to 100% based on the weight of the cake icing composition.

In still further accordance with this invention the food modifying composition utilized in the cake icing composition and the process for making same is disclosed.

Throughout this specification, examples and claims, all parts and percentages are by weight.

DETAILED DESCRIPTION

The food modifying composition constituent of the cake icing composition is a dispersion of between about 1% to about 15% edible soy fiber dispersed in about 99% to about 85% aqueous liquid. The edible soy fiber of this dispersion is defined by a particle size in the range of between about 0.1 micron and about 20 microns. Preferably, the soy fiber is characterized by a particle size in the range of between about 0.1 micron and about 10 microns. More preferably, the particle size of the soy fiber is in the range of between about 2 microns and about 7 microns.

The edible soy fiber of this invention is mostly cellular wall material from the soybean. Microparticulated to the above recited size, it is unique and critical to giving the desired properties to the food modifying composition. Other natural edible fibers, such as corn, barley, wheat, oats, rye and rice are not available commercially in the form of mostly cell wall material and thus have not been found acceptable for providing these properties.

Plant components which make up dietary fiber can be divided into three categories: structural polysaccharides (cellulosic and hemicellulosic carbohydrates), non-structural polysaccharides (pectin, gums, mucilages) and structural non-polysaccharides (lignin). Soy fiber is a mixture of cellulosic and non-cellulosic internal cell wall structural components. Its major fractions are non-cellulosic and consist of acidic polysaccharides, arabinogalactan, arabinan chains and about 10% cellulosic components. Acidic polysaccharides are highly-branched polymers made of a backbone of D-galacturonic acid and D-galactose interspersed with l-rhamnose. Side chains associated with acidic polysaccharides are composed of galactose, xylose and fucose residues. Arabinogalactan fractions are composed of short 1 to 5 linked L-arabinose side chains attached to a backbone of 1 to 4 linked galactose residues. The arabinan chains are 1 to 3 chains and 1 to 5 linked polymers of L-arabinose residues. Cellulosic residues are 1 to 4 linked glucose residues, forming linear chains. It is this blend of carbohydrate polymers that contributes the unique functional properties of soy fiber.

A preferred edible soy fiber for use in this invention is Fibrim 1250 produced commercially by Protein Technologies International, Checkerboard Square, St. Louis, Mo. 63164. This is a bland dietary soy fiber, low in fat, calories and sodium. It is tan in color, bland in flavor. and has particle size of above 100 microns (20 mesh). It is comprised of cellulosic and non-cellulosic dietary fibers (primarily cell wall material of soybean cotyledon derived from processing dehulled and defatted soybean flakes). It is neither soybean hull nor soy bran. It provides a bland, odorless fiber source containing about 75% total dietary fiber.

| TYPICAL ANALYSIS OF FIBRIM ® SOY FIBER IS AS FOLLOWS: | |
| --- | --- |
| Component | % |
| Moisture | 6.0 |
| Protein | 12.0 |
| Fat (EE) | 0.2 |
| Ash | 4.5 |
| Dietary Fiber | 75.0 |

| CARBOHYDRATE ANALYSIS OF FIBRIM ® SOY FIBER IS AS FOLLOWS: | |
| --- | --- |
| Component | % |
| Cellulose | 10 |
| Hemicellulose and non-cellulosic polysaccharides | 65 |
| TOTAL DIETARY FIBER | 75 |

Micromilling the Fibrim 1250 soy fiber to the above stated critical particle size in the presence of an aqueous liquid produces a food modifying composition having fat-like or cream-like properties not present in the commercially produced Fibrim 1250 soy fiber. Micromilling of other commercially available soy fibers, other than Fibrim 1250, produces comparable cream-like and fat-like properties in the micromilled soy fiber.

The dispersant of the food modifying composition is any desired aqueous liquid such as water, milk or an aqueous sugar solution. If an aqueous sugar solution is used, it preferably comprises about 30% to about 70% sugar and about 40% to about 75% water. The weight ratio of sugar to water may be in the range of between about 0.5:1 and about 1.5:1. More preferably, the weight ratio of sugar to water is in the range of between about 0.75:1 and about 1:1 and most preferably about 0.80:1. Any solid or liquid sugar can be used. Solid sugars such as sucrose, fructose and dextrose are suitable. Liquid sugars such as invert sugar, corn syrup solids, high fructose corn syrup solids, glycerol, and sorbitol are suitable.

The edible soy fiber constituent of the food modifying composition, having the particle size range mentioned above, comprises between about 1% and about 15% of the food modifying composition. The water, milk or aqueous sugar solution constituent of the food modifying composition is present in a concentration of between about 85% and about 99%. Preferably, the soy fiber has a concentration of between about 7% and about 12% and the water, milk or aqueous sugar solution has a concentration of between about 88% and 93%. Most preferably, the soy fiber is about 8% to about 10% and the water, milk or aqueous sugar solution between about 90% and about 92%.

Cake icings are essentially fat systems that are sweetened with sugar. In a typical full-fat frosting, fat comprises about 23% of the formula weight, sugar about 55%, and non-fat dry milk (NFDM) about 3%. After removing the fat, the primary ingredients left are sugar and non-fat dry milk. These ingredients must be held together by a suitable moisture system which supplies the fat-like mouthfeel and taste. The food modifying composition of this invention provides such a suitable moisture system as well as a fat-like mouthfeel and taste. The food modifying composition of this invention gives a dramatic improvement in the mouthfeel and taste of these no-fat or low-fat icings moving them close to a full-fat counterpart. The composition can be used directly at the 100% level as an icing-base itself or it may be added to an icing at the 10% to 100% level.

As indicated a sugar-based icing can be made with the fat removed. This icing can be made directly from the food modifying composition itself wherein the composition is sugar, water and micromilled soy fiber. The micromilled soy fiber serves the purpose of supplying the fat-like mouthfeel (as well as other desired properties) to this sugar-based icing. The water serves as the lubricating and hydrating agent. The sugar serves to decrease the amount of water and to increase the total solids.

An alternative to making this icing directly from 100% food modifying composition is to add the composition to a sugar-water icing base. In this embodiment, the sugar constituent, independent of the sugar in the food modifying composition, is present in a concentration of between about 0% and about 75% by weight, based on the total weight of the cake icing composition. More preferably, the sugar constituent represents between about 30% and about 50% by weight of the cake icing composition. The sugar constituent is preferably provided as a small particle (10×) sugar. Small particle sugar (less than 100 microns and preferably less than 50 microns) aids in giving a smooth mouthfeel to the cake icing composition. Granular sugar, which has a larger particle size can be heated to dissolve the granular sugar and thus give a smooth mouthfeel. An acceptable vanilla icing can be prepared by mixing about ⅓ parts of the food modifying composition with about ⅓ parts of confectioners sugar and ⅓ parts of fondant. Fondant is a sugar mixture made of approximately 85% saturated sucrose solution (67% sucrose and 33% water) and 15% corn syrup. This mix is boiled to 230° F., cooled to 100° F., and then cooled with agitation until it forms a plastic mass which crystallizes into with very small, uniform sugar crystals.

The water constituent of the cake icing composition, independent of the water in the food modifying composition, is either provided as an independent constituent or as the solvent of an aqueous solution to be discussed below. Irrespective of how the water is provided in the cake icing composition, it is preferably present in the cake icing composition in a concentration of between about 0% and about 30% by weight. More preferably, this concentration is in the range of between about 6% and about 25%, most preferably about 18%. These percentages for the water constituent are by weight, based on the total weight of the cake icing composition.

The food modifying composition is preferably included in the cake icing composition in the range of between about 10% and about 100% by weight, based on the total weight of the cake icing composition. More preferably, the food modifying composition represents between about 15% and about 60% by weight of the cake icing composition.

As indicated, a typical cake icing composition includes non-fat dry milk. In this embodiment the independent water constituent of the cake icing composition serves, among other functions, to dissolve the solid state milk constituent. In the embodiment wherein non-fat dry milk is included in the cake icing composition, it is provided at about 0.5% and about 6% by weight, based on the total weight of the cake icing composition.

An alternative to a sugar-based icing is a starch-based icing. Starches have been used to thicken low-fat or no-fat icings. However, addition of starches or gums to these icings still leaves a stringy, thick icing devoid of any cream-like or fat-like mouthfeel. The food modifying composition of this invention can be combined with starch-based ingredients at about the 10% to about 80% level, preferably at about 50% to about 70%, and most preferably at about 55% to about 65% to provide a very acceptable no-fat icing or frosting.

The following starch-based ingredient formula when combined with the food modifying composition of this invention gives an acceptable no-fat icing.

| Starch-Base Ingredients | % Range |
| --- | --- |
| water | 25–50 |
| sugar | 45–70 |
| starch | 5–10 |
| gum | 0.05–0.3 |
| salt | 0.2–0.4 |
| preservative | 0.1–0.2 |

The only essential ingredients for this icing are the starch, sugar and food modifying composition. The starch is preferably any uncooked starch, including tapioca, wheat or corn starch, but pregelatinized starches can be used. The sugar is sucrose, invert sugar or a combination of invert and sucrose. The gum ingredient can be any hydrocolloid gum. Agar agar, gelatin, locust bean gum, or carrageenan are preferred with agar agar most preferred. Any food approved preservative, including sorbate can be used. A very suitable starch-base comprises about 0.17% agar agar, about 7.67% tapioca starch, about 17% invert sugar, about 32% water, about 43% sugar and about 0.16% sorbate. These ingredients when blended with the food modifying composition at the appropriate levels indicated provide an icing with an Aw of 0.84 to 0.88, preferably about 0.86 which can be easily combined with a cake having an Aw of 0.86 to 0.88 with superior stability results at the interface.

The above described food modifying composition can be used to make any no-fat frosting or icing, such as vanilla, banana, chocolate, maple, strawberry and the like. In many of these icings, the greyish cast caused by the micromilled soy fiber is effectively masked by the color of the frosting. However, in the case where a white vanilla frosting is desired, the color of the frosting while white, has a greyish cast. This is a consumer negative where a perfectly white frosting is desired.

Addition of a conventional opacifier or color, such as titanium dioxide to the slurry prior to wet-milling helps to improve the "white" color problem. The opacifier is added at about 0.1% to about 2.0% and preferably about 0.5% to about 1.5% and most preferably about 0.8% to about 1.2%, based on the weight of the food modifying composition. However, the final white frosting is still not perfectly white in color.

This deficiency in producing a perfectly white vanilla frosting can be remedied by increasing the viscosity of the food modifying composition prior to wet-milling by addition of a non-gelling, non-abrasive edible hydrocolloid to the slurry prior to wet-milling. Addition of between about 0.001% to about 1.5%, preferably 0.001 to about 0.8 based on the weight of food modifying composition of any edible hydrocolloid will enhance the whitening effect to an acceptable level. The amount of hydrocolloid or gum added will vary depending on the thickening strength of the particular hydrocolloid or gum. For example, in the case of gum arabic the preferred range is about 0.3% to about 0.9%, and most preferred is about 0.5 to about 0.7%. For carboxymethyl cellulose (CMC), locust bean gum, and carrageenan the preferred range is about 0.01% to 0.05% with about 0.02% most preferred. For guar gum, the range is bout 0.001% to about 0.01%, with 0.001 to about 0.05 most preferred. While the above gums are preferred, addition of any hydrocolloid will serve as a whitening enhancer. Other suitable hydrocolloids are gum ghatti, karaya, tragacanth, agar, alginate, xanthan, gellan, and methyl cellulose. Other hydrocolloids such as gelatin, chitin, the starches of wheat, rice, waxy maize, tapioca, potato, and konjac can also be use as whitening enhancers.

It is emphasized that the food modifying composition included in the cake icing composition of the present invention is a paste-like composition having remarkable properties. For example, this paste-like composition remains soft under freezing conditions. That is, ice crystal growth is avoided at freezing temperatures. Similarly, the sugar included in the food modifying composition docs not crystallize out at these freezing temperatures. Surprisingly, the food modifying composition exhibits hydrophobicity. This desirable property prevents dissipation of the composition in aqueous systems unless mechanical force is used. Thus, the food modifying composition when dispersed in an aqueous system remains suspended. The food modifying composition is furthermore characterized by a wet appearance, imparting a desirable shiny or wet look to cake icings made from the cake icing composition of the present invention.

The process of the present invention involves the formation of the above-discussed cake icing composition. In this process the constituents of the cake icing composition, the food modifying composition, the sugar and/or starch and the water, independent of the inclusion of these constituents in the food modifying composition, are blended together, with other desired optional ingredients, such as non-fat dried milk, in a mixing apparatus suitable to the task of intimately blending the constituents. It is particularly desirably that this blending be accompanied by the incorporation of air into the cake icing composition. For example, a Hobart TM vertical mixer or an Oakes TM continuous machine is oftentimes used so as to insure that the blending operation is accompanied by aeration. The concentration of the constituents blended together to make the cake icing composition are those concentrations recited above in the discussion of the cake icing composition.

It should also be appreciated that the making of the critical food modifying composition involves the introduction of the edible soy fiber, as identified earlier, in a concentration within the ranges discussed above, into a wet-miller dispersed in an aqueous liquid, present in the concentration ranges recited above. The edible soy fiber material, limited by the requirement that it have an average particle size in excess of about 20 microns, is wet-milled to decrease its particle size to the ranges required by the cake icing composition of the present invention.

The following examples are given to illustrate the scope of the present invention. Because these examples are given solely for illustrative purposes, the invention should not be limited thereto.

EXAMPLES 1-16

Preparation of Food Modifying Composition of Micromilled Soy Fiber Paste

For each of the examples, the parts are by weight. The soy fiber was Fibrim TM 1250 (a soy fiber having an average particle size of about 100 microns) and the aqueous liquid water, milk, or a sugar solution. Each of the slurries containing the dispersed soy fiber particles were introduced into a Dyno-Mill TM KD-5 wet-mill grinder manufactured by Glen Mill, Inc., Maywood, N.J. This was accomplished by pumping the slurry into a horizontal grinding chamber filled with zirconium dioxide beads. A rotating shaft (1500 rpm) fitted with discs drove the beads which produced high shear and impact. This wet-milling step resulted in the pulverization of the soy fiber particles. This grinding step occurred at a temperature of between 50° C. and 60° C. and at atmospheric pressure.

Except for Example 6 (which could not be run through the Dyno-Mill), the pulverized product, in each example, was a uniform and smooth dispersion with an average mean particle size of between 2 and 7 microns. Specifically, analysis of the particles showed that all the particles had a size of between 0.1 micron and 20 microns with between 75% and 80% of the particles being between 2 microns and 10 microns. About 10% of the particles were smaller than 2 microns and about 10% of the particles were larger than 10 microns. No particles were larger than 20 microns.

Each dispersion, except for Example 6, which was shelf-stable, did not solidify, even at freezer temperatures, and did not evidence ice crystal growth. Each dispersion was not only spreadable, in a manner similar to margarine, but did not disperse in aqueous systems without mechanical force.

EXAMPLES 1-16
PREPARATION OF FOOD MODIFYING COMPOSITION OF MICROMILLED SOY FIBER PASTE

| Ingredients | 1 | 2 | 3 | 4 | 5 | 6 | 7 | 8 | 9 | 10 |
|---|---|---|---|---|---|---|---|---|---|---|
| Fibrim 1250 | 5 | 8 | 8 | 15 | 15 | 20 | 8 | 8 | 8 | 8.5 |
| sucrose | | | | | | | 20 | 40 | 55.5 | 25 |
| sorbitol | | | | | | | | | | 15 |
| fructose | | | | | | | | | | |

-continued

EXAMPLES 1-16
PREPARATION OF FOOD MODIFYING COMPOSITION OF MICROMILLED SOY FIBER PASTE

| Ingredients | 1 | 2 | 3 | 4 | 5 | 6 | 7 | 8 | 9 | 10 |
|---|---|---|---|---|---|---|---|---|---|---|
| dextrose | | | | | | | | | | |
| 35 DE dextrin | | 20 | | | | | | | | |
| HFCS 95 | | | 92 | | | | 72 | 52 | 35 | |
| water | 75 | 92 | | 85 | | 80 | | | | 51 |
| milk | | | | | 85 | | | | | |
| TiO₂ | | | | | | | | | 1.0 | 1 |
| gum arabic | | | | | | | | | 0.5 | |
| TOTAL | 100 | 100 | 100 | 100 | 100 | 100 | 100 | 100 | 100 | 100 |
| color | grey | grey | grey | grey | grey | No Sample | grey | grey | white | white/grey |

| Ingredients | 11 | 12 | 13 | 14 | 15 | 16 |
|---|---|---|---|---|---|---|
| Fibrim 1250 | 8.5 | 8.5 | 8.5 | 8.5 | 9.5 | 9.5 |
| sucrose | 40 | 40 | 40 | | 30 | 30 |
| sorbitol | | | | | 10 | 10 |
| fructose | | | | 20 | | |
| dextrose | | | | 20 | | |
| 35 DE dextrin | | | | | | |
| HFCS 95 | | | | | | |
| water | 51 | 50.5 | 50 | 50 | 50 | 48.5 |
| milk | | | | | | |
| TiO₂ | 0.5 | 1 | 1 | 1 | 0.5 | 1.25 |
| gum arabic | | | 0.5 | 0.5 | | 0.75 |
| TOTAL | 100 | 100 | 100 | 100 | 100 | 100 |
| color | grey | white/grey | white | white | grey | white |

EXAMPLES 17-27

Preparation of a Vanilla Icing

A series of ten (10) no-fat icings were prepared using the following ingredients and several of the Food Modifying Composition taken from Examples 1-16.

The starch base comprising 0.17% agar agar, 7.67% tapioca starch, 17% invert sugar, 32% water, 43% granulated sugar, and 0.16 sorbate was mixed into a steam kettle and cooked for about 10 minutes or until a temperature of 210° F. was reached. The mixture was then allowed to cool to 160° F. (about 20 minutes) prior to being used.

The 10× sugar is a small particle sugar having a particle size of about 50 microns. Granular sugar can be used in its place, if heated and melted to reduce its particle size.

Fondant is a sugar mixture made up of 85% saturated sugar solution and 15% corn syrup. This mixture is boiled to 230° F., cooled to 100° F., and then further cooled with agitation until it forms a plastic mass which crystallizes into small, very uniform sugar crystals.

The Example 17 icing was made directly by using 100% of the Example 9 Food Modifying Composition. The Example 9·dispersion was simply whipped in a Hobart ™ for about 2 minutes until the frosting was smooth and shiny.

The remaining samples were prepared by simply blending the stated ingredients together and aerated the mixture in a Hobart ™ vertical mixer for about 2-3 minutes.

All the samples gave acceptable vanilla frostings which came close to duplicating the mouthfeel, taste and texture of a full-fat frosting. However, the frosting which did not contain titanium dioxide and/or gum arabic had a distinct gray cast. Addition of titanium dioxide improved the whiteness but did not achieve a perfectly white color. Addition of gum arabic in combination with the titanium dioxide gave the desired whiteness required to duplicate the white color of a full-fat icing.

EXAMPLES 17-27
PREPARATION OF VANILLA ICING

| Icings | 17 | 18 | 19 | 20 | 21 | 22 | 23 | 24 | 25 | 26 | 27 |
|---|---|---|---|---|---|---|---|---|---|---|---|
| Ex. 9 Food Modifying Composition | 100% | | | | | | | | | | |
| Ex. 13 Food Modifying Composition | | 49.34 | | | | 33.3 | 27.68 | 25.00 | 24.49 | 25.00 | 22.2 |
| Ex. 12 Food Modifying Composition | | | 49.34 | | | | | | | | |
| Ex. 16 Food Modifying Composition | | | | 49.3 | | | | | | | |
| Ex. 15 Food Modifying Composition | | | | | 49.3 | | | | | | |
| Starch Base | | 49.34 | 49.3 | 49.3 | | | | | | | |
| 10x Sugar | | | | | | 33.34 | 29.24 | 41.67 | 40.82 | 41.67 | 66.7 |
| H₂O | | | | | | | | | | | 7.0 |
| Fondant | | | | | | 33.33 | 29.24 | 33.33 | 32.65 | 31.25 | |
| NFDM | | 0.66 | 0.66 | 0.66 | 0.66 | | | | | | 4.1 |
| Pea Fiber | | 0.66 | 0.66 | 0.66 | 0.66 | | | | | | |
| Corn Oil | | | | | | | | | 2.04 | | |
| Monoglycerides | | | | | | | | | | 2.08 | |
| Corn Syrup | | | | | | | 13.84 | | | | |
| TOTAL | 100 | 100 | 100 | 100 | 100 | 100 | 100 | 100 | 100 | 100 | 100 |
| % H₂O | | 17.7 | 17.8 | 17.8 | 17.8 | 16.3 | 18.1 | 19.8 | 19.9 | 19.8 | 12.2 |
| Aw | 0.93 | 0.89 | 0.89 | .89 | 0.89 | .82 | 0.74 | 0.82 | 0.82 | 0.82 | 0.80 |
| T(Aw) | | 25.0 | 20.1 | 20.1 | 20.1 | 26.8 | 27.0 | 26.5 | 26.7 | 26.5 | 26.5 |

EXAMPLES 17-27
PREPARATION OF VANILLA ICING

| Icings | 17 | 18 | 19 | 20 | 21 | 22 | 23 | 24 | 25 | 26 | 27 |
|---|---|---|---|---|---|---|---|---|---|---|---|
| Color | | white | gray | white | gray | white | white | white | white | white | white |

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the scope of the present invention should be limited only by the appended claims.

What is claimed is:

1. A food modifying composition comprising a dispersion of an edible soy fiber having a particle size in the range of between about 0.1 microns and about 20 microns, present in a concentration of between about 1% and about 15%, and an aqueous liquid, present in a concentration of between about 85% and about 99%, said percentages being by weight, based on the total weight of said food modifying composition.

2. A food modifying composition in accordance with claim 1 wherein said soy fiber has a particle size in the range of between about 2 microns and about 7 microns.

3. A food modifying composition in accordance with claim 1 wherein said aqueous liquid is water.

4. A food modifying composition in accordance with claim 1 wherein said aqueous liquid is milk.

5. A food modifying composition in accordance with claim 1 wherein said aqueous liquid is an aqueous sugar solution.

6. A food modifying composition in accordance with claim 1 wherein said aqueous liquid is an aqueous sugar solution comprising about 30% to about 70% sugar and about 40% to about 75% water.

7. A food modifying composition in accordance with claim 6 wherein the sugar is sucrose, fructose, dextrose or other solid sugar.

8. A food modifying composition in accordance with claim 6 wherein the sugar is corn syrup solids, high fructose corn syrup solids, glycerol, sorbitol or other liquid sugar.

9. A food modifying composition in accordance with claim 1 wherein said soy fiber is present in a concentration of between about 7% and about 12% and said aqueous sugar solution is present in a concentration of between about 88% and about 93%.

10. A food modifying composition in accordance with claim 1 wherein about 0.001 to about 1.5% of an edible non-gelling, non-abrasive hydrocolloid is present as a whitening enhancer.

11. A food modifying composition in accordance with claim 10 wherein the hydrocolloid whitening enhancer is gum arabic at about 0.3% to about 0.9%.

12. A food modifying composition in accordance with claim 10 wherein the hydrocolloid is carboxymethyl cellulose, locust bean gum, or carrageenan at about 0.01% to about 0.05%.

13. A food modifying composition in accordance with claim 10 wherein the hydrocolloid is guar gum at about 0.001% to about 0.01%.

14. A food modifying composition in accordance with claim 1 wherein about 0.1% to about 2.0% of titanium dioxide is present.

15. A food modifying composition in accordance with claim 10 wherein about 0.5% to about 1.5% of titanium dioxide is present.

16. A cake icing comprising about 10% to 100% of the food modifying composition of claim 1.

17. A cake icing composition comprising sugar, water and the food modifying composition of claim 1.

18. A cake icing composition in accordance with claim 16 wherein said soy fiber has a particle size in the range of between about 2 microns and about 7 microns.

19. A cake icing composition in accordance with claim 16 wherein said soy fiber and said aqueous sugar solution are present in said food modifying composition in a concentration of between about 7% and about 12% and between about 88% and 93%, respectively, based on the total weight of said food modifying composition.

20. A starch-based cake icing composition in accordance with claim 16 wherein the icing contains about 25–80% sugar, about 25–50% water and about 2–10% starch, based on the weight of said icing composition, said concentrations being independent of the sugar and water content of said food modifying composition.

21. The starch-based cake icing of claim 20 wherein the food modifying composition contains about 0.001% to about 1.5% of an edible hydrocolloid, based on the weight of the food modifying composition.

22. The starch-based cake icing of claim 21 wherein the hydrocolloid is gum arabic at about 0.3% to about 0.9%.

23. The starch-based cake icing of claim 22 wherein the food modifying composition contains about 0.5% to 1.5% titanium dioxide, based on the weight of the food modifying composition.

24. A process for making a cake icing composition comprising blending sugar, water and a food modifying composition, said food modifying composition formed by dispersing an edible soy fiber having a particle size of above about 20 microns in an aqueous liquid such that the soy fiber comprises between about 1% and about 15% and said aqueous liquid comprises between about 85% and about 99%, said percentages being by weight, based on the total dispersion weight, and wet-milling said dispersion so that the particle size of the soy fiber is reduced to a range of between about 0.1 micron and about 20 microns.

25. A process in accordance with claim 24 wherein in said wet-milling step results in a reduction in the particle size of said soy fiber to a range of between about 2 microns and about 7 microns.

26. The process of claim 24 wherein the aqueous liquid in the food modifying composition is water.

27. The process of claim 24 wherein the aqueous liquid in the food modifying composition is milk.

28. The process of claim 24 wherein the aqueous liquid in the food modifying composition is an aqueous sugar solution.

29. The process of claim 24 wherein the aqueous liquid in the food modifying composition is an aqueous sugar solution comprising about 30% to about 70% sugar and about 40% to about 75% water.

30. The process of claim 29 wherein the sugar is sucrose, fructose, dextrose or other solid sugar.

31. The process of claim 29 wherein the sugar is corn syrup solids, high fructose corn syrup solids, glycerol, sorbitol or other liquid sugar.

32. A process in accordance with claim 29 wherein said soy fiber is present in said food modifying composition in a concentration of between about 7% and about 12% and said aqueous sugar solution is characterized by a sugar to water weight ratio in the range of between about 0.75:1 and about 1:1, present in a concentration of between about 88% and about 93%, said percentages being by weight based upon the total weight of said food modifying composition.

33. A process for making a food modifying composition comprising dispersing an edible soy fiber having a particle size above about 20 microns in an aqueous liquid such that the soy fiber comprises between about 1% and about 15% and said aqueous liquid comprises between about 85% and about 99%, said percentages being by weight, based on the total dispersion weight; and wet-milling said dispersion so that the particle size of said edible soy fiber is reduced to a range of between about 0.1 micron and about 20 microns.

34. A process in accordance with claim 33 wherein said edible soy fiber is wet-milled to a particle size in the range of between about 2 microns and about 7 microns.

35. The process of claim 33 wherein the aqueous liquid is water.

36. The process of claim 33 wherein the aqueous liquid is milk.

37. The process of claim 33 wherein the aqueous liquid is an aqueous sugar solution.

38. The process of claim 33 wherein the aqueous liquid is an aqueous sugar solution comprising about 30% to about 70% sugar and about 40% to about 75% water.

39. The process of claim 38 wherein the sugar is sucrose, fructose, dextrose or other solid sugar.

40. The process of claim 38 wherein the sugar is corn syrup solids, high fructose corn syrup solids, glycerol, sorbitol, or other liquid sugar.

* * * * *